J. P. KARR.
Bee-Hive.

No. 212,949. Patented Mar. 4, 1879.

WITNESSES:
Achilles Schehl.
C. Sedgwick.

INVENTOR:
J. P. Karr
BY Munn & Co
ATTORNEYS.

UNITED STATES PATENT OFFICE.

JAMES P. KARR, OF MONTICELLO, INDIANA.

IMPROVEMENT IN BEE-HIVES.

Specification forming part of Letters Patent No. 212,949, dated March 4, 1879; application filed August 19, 1878.

*To all whom it may concern:*

Figure 1:
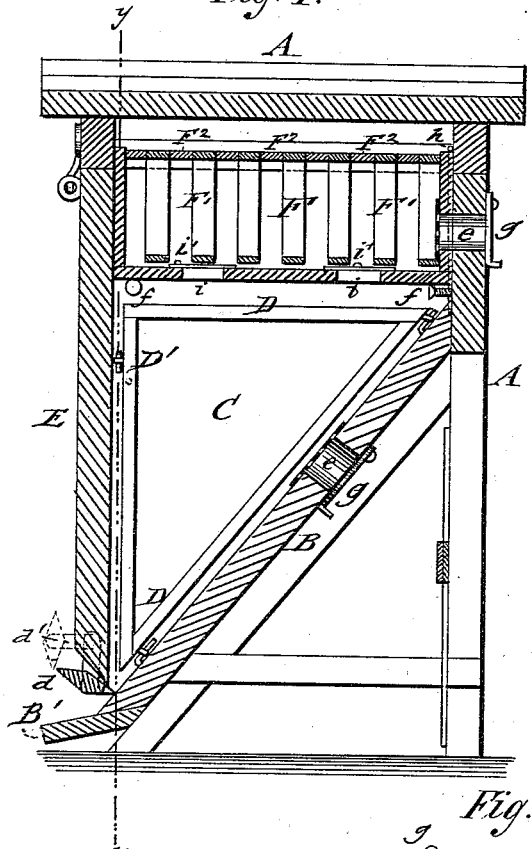
Figure 2:
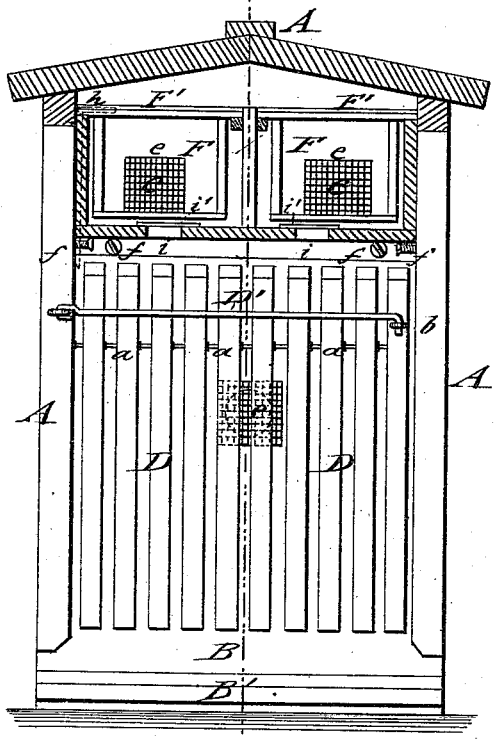
Figure 3:
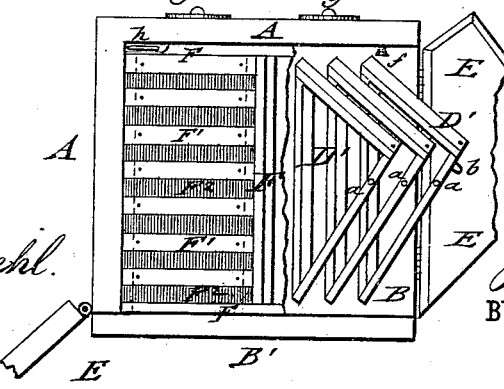
Figure 4:
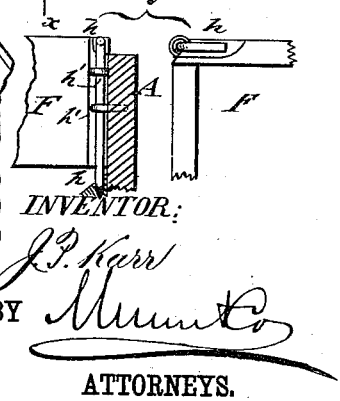

Be it known that I, JAMES P. KARR, of Monticello, in the county of White and State of Indiana, have invented a new and Improved Bee-Hive, of which the following is a specification:

In the accompanying drawings, Figure 1 represents a vertical central section on line $x\ x$, Fig. 2, of my improved bee-hive. Fig. 2 is a front elevation of the hive, partly in section, on line $y\ y$, Fig. 1. Fig. 3 is a top view of the hive with lid removed, side and front doors opened, and part of honey-box broken off, to show the hinged brood-frames below. Fig. 4 shows a side and top view of connection of honey-box with hive.

Similar letters of reference indicate corresponding parts.

This invention has reference to such improvements in bee-hives that any frame that is filled with honey may be readily removed from the honey-box, and the latter, as well as the brood-chamber inspected with great facility. The brood-chamber is so constructed that every part is removable for colonizing the bees, by placing the removed parts into a new hive. The entire hive is readily kept clean and ventilated, and accessible in every part thereof.

The invention consists of a bee-hive with a brood-chamber having inclined bottom and hinged detachable frames that are locked by a hook-arm and inclosed hinged front and side doors, which give access to the brood-chamber. The honey-box is supported on pins or studs, and provided with detachable frames with intermediate glass covers. A wire in one corner of the hive serves to retain the honey-box in connection with staples of the box and hive. A swinging slat of diamond-shaped cross-section is hung to the lower end of door, and arranged with a center recess for the entrance of bees.

Referring to the drawings, A represents a bee-hive that is made of rectangular shape, with an inclined bottom, B, that slants down from the back wall toward the front of the hive, and has an inclined alighting-board, B′. The brood-chamber C is formed of a number of triangular frames, D, that are hinged at their slanting rear sides to the bottom B, and kept by rectangularly-projecting front pins, $a$, at the proper distance from each other. They are locked rigidly together by a hook-arm, D′, that is pivoted to the side wall of the hive, and inserted into an eye or staple, $b$, of the outermost frame.

The front wall, E, and opposite side wall, E′, of the hive are hinged so as to form doors that admit when being thrown open the opening of the frames D, like leaves of a book, so as to examine the bees and observe their brooding. The frames D may be lifted off their hinges, to be removed from the brood-chamber when it is desired in the swarming season to divide the hive. The detached frames are then hung into a new hive of the same construction, and thereby the bees colonized without loss of time or bees.

The inclined bottom of the brood-chamber facilitates the keeping clean of the hive, as any dirt, worms, &c., roll along the same to the lower front part, and may there be readily removed from the hive.

The front door is provided with a diamond-shaped slat, $d$, that is pivoted by side strips, $d′$, to the bottom of the door, so as to be turned up or down for cleaning or opening the hive. The slat $d$ is recessed at the central part of its lower edge, the recess forming the entrance-opening for the bees. The front and side doors, as well as the hinged top lid, are tightly closed by hooks and eyes or other fastening devices.

Ventilation is given to the hive by means of screened apertures $e$ in the bottom and in the rear wall, back of the honey-box F, which is supported on studs or screws $f$ of the side walls above the brood-chamber. The ventilating-apertures may be partially or entirely opened or closed by pivoted covers $g$, so as to regulate the supply of air according to the exterior temperature.

The honey-box F is filled with racks or frames F$^1$, that rest on its center partition and side walls, and are separated by intermediate horizontal glass plates or covers F$^2$, placed between the tops of the frames, so as to admit the inspecting of the honey-frames from above.

The frames, when filled with honey, are removed, and empty frames substituted therefor, the surplus honey being thus removed in convenient manner and with little annoyance to the bees. The glass covers F$^2$ keep the bees in the honey-box, and prevent any annoyance from the same while looking at the honey-box. The honey-box may be readily removed from the hive by removing a locking-wire, $h$, which is let into a recess at one rear corner, and passed through eyes or staples $h'$ of the box and hive. When the wire is in position, the honey-box is securely retained in the hive. By removing the honey-box the brood-chamber may be inspected in the manner described. The bottom of the honey-box is also provided with ventilating-apertures $i$, and with pivoted covers $i'$, so as to keep the bees out of box when desired. Apertures of either one or both sections of the honey-box may be closed as desired, which is of advantage for removing frames filled with honey. The hive is accessible in all its parts in convenient manner, and gives thereby the apiarist full control over the bees and honey.

Having thus described my invention, I claim as new and desire to secure by Letters Patent—

1. In a bee-hive, a honey-box made of detachable honey-frames and glass panels or covers, placed between the top parts of frames, substantially as described.

2. In a bee-hive, the combination of a removable honey-box, having an eye or staple at one of the rear corners, with a staple of the hive, and a detachable locking-rod that secures connection of box and hive, substantially as set forth.

JAMES POWER KARR.

Witnesses:
WILLIAM H. DOWNEY,
B. F. MOORE.